United States Patent [19]

Frank et al.

[11] 4,291,958
[45] Sep. 29, 1981

[54] CAMERA WITH ELECTRONIC FLASH AND PIEZOELECTRIC LENS MOTOR

[75] Inventors: Lee F. Frank; James K. Lee, both of Rochester, N.Y.

[73] Assignee: Eastman Kodak Company, Rochester, N.Y.

[21] Appl. No.: 193,771

[22] Filed: Oct. 3, 1980

[51] Int. Cl.³ .............................................. G03B 3/10
[52] U.S. Cl. .................................. 354/25; 352/140; 354/195
[58] Field of Search ............... 354/25, 195, 198, 145; 352/140; 355/56

[56] References Cited

U.S. PATENT DOCUMENTS

| | | | |
|---|---|---|---|
| 3,917,395 | 11/1975 | Ogawa | 354/195 X |
| 3,932,700 | 1/1976 | Snopko | 250/201 X |
| 3,945,023 | 3/1976 | Stauffer | 354/25 |
| 3,974,327 | 8/1976 | Van Dijk | 250/201 X |
| 3,997,715 | 12/1976 | Elliott | 250/201 X |

OTHER PUBLICATIONS

IEEE Transactions on Audio and Electroacoustics, vol. AV-19, No. 1, Mar. 1971, "Flexure Mode Piezoelectric Transducers" by C.P. Germano.

*Primary Examiner*—Michael L. Gellner
*Attorney, Agent, or Firm*—T. H. Close

[57] ABSTRACT

An autofocus camera includes an electronic flash and a piezoelectric focus motor that are both powered by a moderately high voltage power supply. The camera includes an automatic focus detector that senses a scene and produces a focus signal representing the required focus adjustment for the scene. A focus motor drive circuit responsive to the focus signal supplies a controlled amount of power from the power supply to the piezoelectric focus motor to drive a movable lens element to effect the required focus adjustment.

10 Claims, 7 Drawing Figures

CAMERA WITH ELECTRONIC FLASH AND PIEZOELECTRIC LENS MOTOR

BACKGROUND OF THE INVENTION

1. Field of the Invention

The present invention relates to photographic cameras and more particularly to apparatus for moving a lens in such a camera.

2. Discussion Related to the Problem

Various schemes have been proposed for automatically determining the required focus adjustment in a photographic camera. A feature common to these schemes is a means for moving a lens element in the camera during or after focus determination. Other cameras include "zoom" lenses, wherein the magnification of the camera lens is varied by moving an element in the lens. Usually movement of the lens element has been accomplished by means of a servo including a rotating electric motor. For example, see U.S. Pat. No. 3,971,395 issued Nov. 4, 1975 to F. T. Ogawa. A servo system using a rotating electric motor to move a lens element in a photographic camera is sub-optimum from the standpoint of cost, size, speed of operation, complexity and power consumption. It is known to use motors other than rotating electric motors in lens moving servo systems for other kinds of optical apparatus. U.S. Pat. No. 3,997,715 issued Dec. 14, 1976 to James E. Elliott discloses the use of a linear motor comprising a speaker coil type drive for use in the focus system of a video disc player. A problem associated with the use of a speaker coil type linear motor in a photographic camera is the relatively high standby power consumption required to hold the lens in the proper focus position during exposure. The '715 patent also suggests the use of "piezoelectric motive means", although further details are not given. It is known that piezoelectric linear motors are relatively small, rugged, simple, fast and when moved to a particular position, draw a minimum of standby power. Unfortunately, there are also problems associated with the use of piezoelectric motors to move lenses in photographic cameras. For one thing, the amount of motion obtainable from a piece of piezoelectric material is relatively small. It is not nearly enough, without some form of mechanical amplification, to move a camera lens a reasonable focusing distance with a reasonably sized piezoelectric element. The other main drawback, which appears to be even more serious, is the fact that piezoelectric materials require relatively high fields to operate; power supplies of 200 to 300 volts being the norm. The added cost of including a 300 volt power supply in a photographic camera just to power a piezoelectric motor would probably outweigh any cost advantages that could be achieved by replacing a rotating electric motor with a piezoelectric motor. These problems, among others, are solved by the present invention.

SOLUTION—SUMMARY OF THE INVENTION

The present inventors have recognized that photographic cameras with built-in electronic flash apparatus already have a moderately high voltage (200 to 300 volts) power supply, and with suitable control circuitry, some of the high voltage power from the supply can be used for driving a piezoelectric lens motor. Hence, according to one aspect of the present invention, a photographic camera having an electronic flash includes a piezoelectric lens motor that is powered by the same moderately high voltage power supply that powers the electronic flash. In the preferred embodiment, the camera includes an automatic focus detector that senses a scene and produces a focus signal representing the required focus adjustment for the scene. A focus motor drive circuit responsive to the focus signal supplies a controlled amount of power from the power supply to the piezoelectric lens motor to drive a movable lens element to effect the required focus adjustment.

According to another feature of the invention, the mechanical displacement achievable from the piezoelectric material is amplified by using a piezoelectric bender and according to a further refinement, the motion supplied by the bender is further amplified by means of a flexible hinge linkage to achieve even greater mechanical displacement. Other features of the invention include damping structures to eliminate ringing of the piezoelectric lens motor and counterbalancing means to eliminate focus shifts induced by gravitational forces on the movable lens element.

BRIEF DESCRIPTION OF THE DRAWINGS

The invention will be described with reference to the drawings, wherein.

DESCRIPTION OF THE PREFERRED EMBODIMENT

Figure 1:
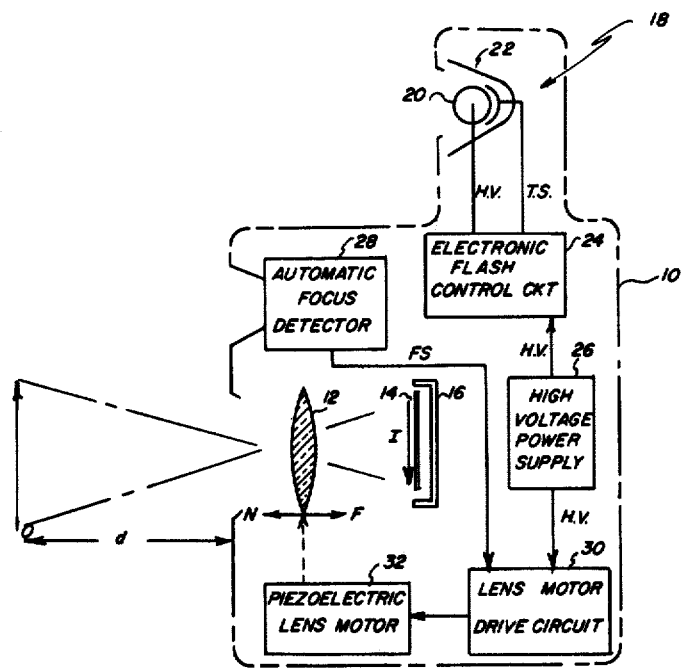
FIG. 1 is a schematic illustration of a photographic camera according to the preferred embodiment of the present invention.

A photographic camera according to the present invention is shown schematically in FIG. 1. The construction of photographic cameras is well known in the art, so only those parts of the camera that cooperate directly with, or that are helpful in understanding, the invention will be shown and described, the othe parts being selectable from those known in the art. The camera includes a body 10, shown in phantom outline, for providing a light-tight housing and supporting the parts of the camera. The camera includes a lens 12 for forming an image I of an object O at a distance d from the camera, on film 14. The film is held in the focal plane of the lens 12 by a film support structure 16. When the distance d of the object O is changed, the focal plane of the lens will no longer coincide with the plane defined by the film support structure 16. In order to accommodate different object distances, the lens 12, or an element thereof, can be moved relative to the film support structure 16 thereby causing the focal plane of the lens to coincide with the plane defined by the film support structure. For objects that are farther away from the camera, the lens is moved in the direction labelled F in FIG. 1, conversely for nearer objects the lens is moved in the direction labelled N. The camera includes an electronic flash, generally designated 18, having for example, a flashlamp 20; a reflector 22; and a flash control circuit 24. The flash control circuit 24 meters high voltage power (200 to 300 volts) to the flashlamp 20, and supplies a flash trigger signal TS to the flashlamp. The high voltage power is supplied to the flash control circuit 24 by a high voltage power supply 26.

The camera also includes an automatic focus detector 28 that is responsive to scene parameters to determine the proper focus adjustment for the scene. For example, the automatic focus detector may determine the proper focus adjustment by measuring the distance d to the object O using either light or sound; both types of systems are well known in the art. The automatic focus detector 28 develops a focus signal FS representative of the required focus adjustment for the object at distance d. The focus signal FS along with the high voltage power from power supply 26 are supplied to a lens motor drive circuit 30. The lens motor drive circuit meters the high voltage power, in response to the focus signal FS, to a piezoelectric lens motor 32 that is coupled to movable lens 12 to effect the required focus adjustment in response to the focus signal FS.

In the presently preferred embodiment of the invention, the piezoelectric lens motor is required to move a lens element about 2 mm to focus from 4 feet to infinity. The motion obtainable from a uniform solid piece of piezoelectric material of reasonable size (a few centimeters long) is only on the order of several microns. The amount of motion obtainable can be amplified by the use of a piezoelectric bender element. Piezoelectric bender elements are available commercially and typically comprise two slabs of suitably poled piezoelectric material such as lead zircontate titanate (PZT) which are bonded together such that, under the application of an electric field, (by means of conducting electrodes on the surfaces of the slabs) one slab expands and the other contracts to produce a curvature or bending of the device. Such bender elements are available under the tradename "Bimorph" from the Vernitron Corporation. More information on the structural details of piezoelectric bender elements can be found in the article by C. P. Germano, entitled "Flexure Mode Piezoelectric Transducers," IEEE Transactions on Audio and Electroacoustics, Vol. AU-19, No. 1, March 1971. Deflections of approximately ½ mm are obtainable from PZT "bimorph" benders approximately 30 cm long. This amount of movement is still insufficient for the application at hand, so additional mechanical amplification of the motion is required.

Figure 2:
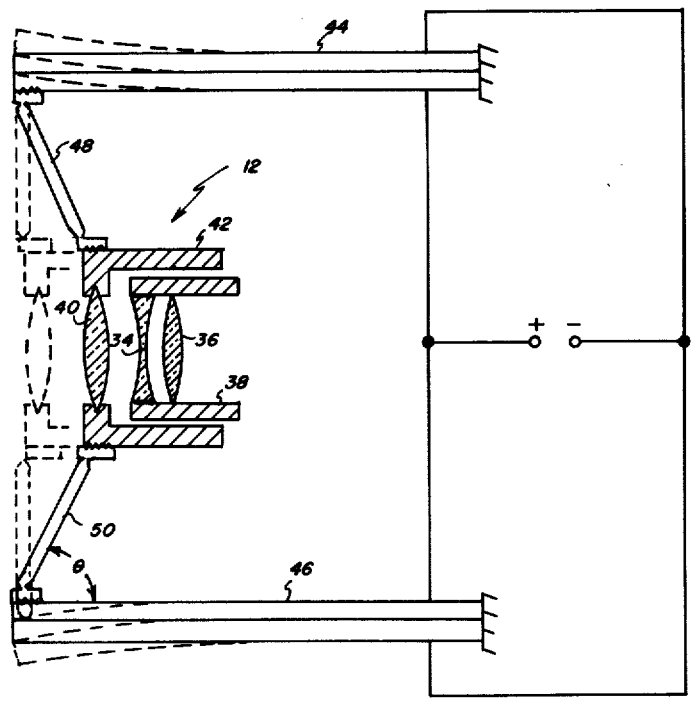
FIG. 2 is a partially schematic side view of a piezoelectric lens motor according to a preferred embodiment of the present invention.

FIG. 2 shows the presently preferred embodiment of the piezoelectric lens motor 32 and the lens 12, with means for achieving the desired mechanical amplification of the motion of the piezoelectric material. Lens 12 comprises a set of lens elements 34 and 36 mounted in a lens barrel 38 that is relatively fixed with respect to the camera body (not shown in FIG. 2), and a lens element 40 mounted in a lens barrel 42 that is slidably movable with respect to the relatively fixed lens barrel 38 to effect focus adjustment of lens 12. The piezoelectric lens motor comprises a pair of piezoelectric bender elements 44 and 46 each about 30 mm long, 0.5 mm thick, and 5.0 mm wide. The bender elements 44 and 46 are mounted in cantilever fashion with respect to the camera body, and the free ends thereof are connected to the movable lens barrel by means of hinged links 48 and 50. Each hinged link is approximately 35 mm long. When relaxed, that is when no voltage is applied to the piezoelectric benders, the hinged links make an angle θ of approximately 75° with respect to the bender element. When high voltage is applied to the benders, the benders deflect away from the lens elements as shown by dotted lines in FIG. 2. The motion of the tips of the bender elements is amplified and transmitted to movable lens barrel 42 by hinged links 48 and 50 as shown in FIG. 2. The amount of displacement achievable by this arrangement is reproducably controllable by the voltage applied to the bender elements. Since the decay of piezoelectric properties is extremely slight over relatively long periods, the effects of aging on the performance of the motor is negligible.

Overshoot or ringing of the motor is controlled by the relatively close overlapping fit of lens barrels 38 and 42, which cooperate to provide a pneumatic damper. As the lens moves, air is forced in or out of the chamber formed by the lens barrels and the lenses to provide damping.

Figure 3:
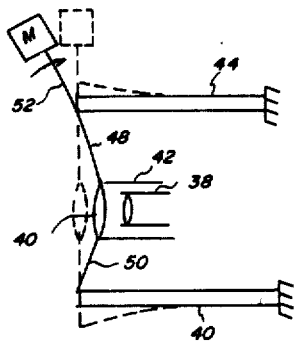
FIG. 3 is a schematic side view of the piezoelectric lens motor shown in FIG. 2 and further including counterbalancing means.

The piezoelectric benders were found to be sufficiently stiff so that there was no significant displacement of the movable lens element perpendicular to its optical axis due to gravity, however, some displacement was noted along the axis when the camera was aimed up or down. This movement is eliminated by counterbalancing the weight of the movable lens element and lens barrel as shown in FIG. 3. A mass M is fixed to an extension 52 of hinged link 50 to counterbalance the massive lens barrel 42 and lens element 40. Although two symmetrical masses extending from links 48 and 50 would provide a theoretically superior counterbalance, the one mass was found to be sufficient since the tilt introduced by the assymmetry of the arrangement was negligible.

Figure 4:
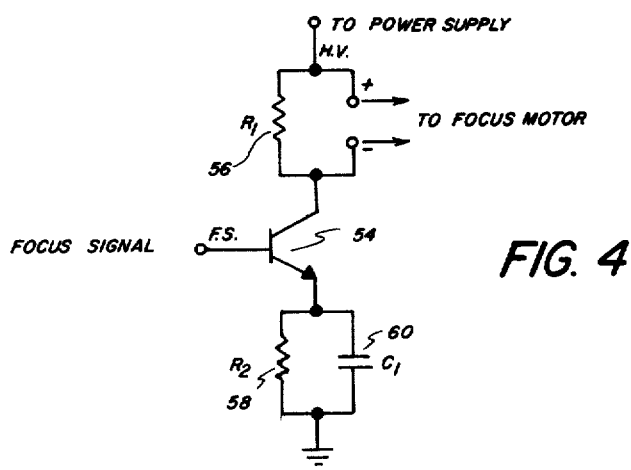
FIG. 4 is a schematic circuit diagram of a lens motor control circuit according to the preferred embodiment of the present invention.

In the preferred embodiment of the present invention, the focus signal FS developed by the automatic focus detector 28 (see FIG. 1) comprises a voltage (0 to 5 volts) that is proportional to the reciprocal of the distance to the object O. FIG. 4 is a schematic diagram of the focus motor drive circuit used in the preferred embodiment. The focus signal FS is applied to the base of a single high voltage transistor 54 that is operated with emitter follower type feedback to control the voltage applied to the focus motor from the high voltage power supply. The resistances R1 and R2 of resistors 56 and 58 and the capacitance C1 of capacitor 60 are chosen such that the feedback network (resistor 58, capacitor 60) has the same time constant as the high voltage section of the circuit (resistor 56 and the piezoelectric motor considered as a capacitor) to minimize the charging time of the piezoelectric motor. If the lens element 40 is parked at the hyperfocal distance or far point when the piezoelectric motor is not energized, this circuit provides a maximally fast adjustment to an initial focus position, with somewhat slower accommodation to later changes in the focus, since the discharge time of the piezoelectric motor is determined solely by the resistance R1.

We found the servo to be sufficiently stable and positions sufficiently reproducable so that positional feedback information was not required. Considerable economies result from the simplicity of such an "open loop" servo system.

Figure 5A:
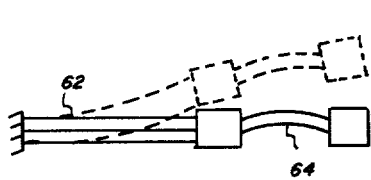
FIGS. 5a through 5c are side views of alternative embodiments of piezoelectric lens motors according to the present invention.
Figure 5B:
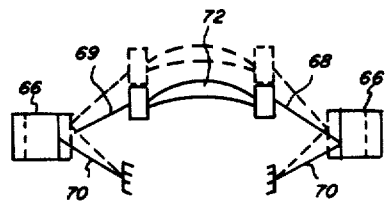
Figure 5C:
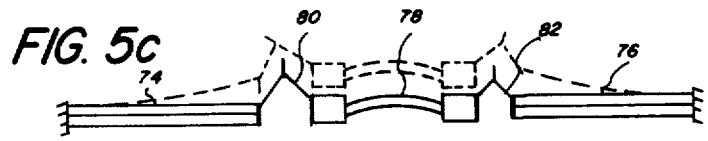

Several alternative embodiments of the piezoelectric lens motor are shown in FIGS. 5a through 5c. FIG. 5a shows a simple cantilever bender 62 to which a lens element 64 is attached. The amount of lens movement achievable with such an arrangement is sufficient for focusing relatively short focal length lenses (e.g. approximately 20 mm). FIG. 5b shows a piezoelectric motor that employs a ring 66 of piezoelectric material.

The ring is shown in cross-section. The ring 66 contracts in the presence of an electric field. The ring of piezoelectric material surrounds a motion amplifying mechanical structure comprising a pair of resilient cone washers 68 and 70. The inner edge of cone washer 70 is fixed to the camera body and a movable lens element 72 is mounted inside cone washer 68. When the ring of piezoelectric material contracts, the lens is displaced as shown by the dotted lines in FIG. 5b.

FIG. 5c shows a cantilever arrangement similar to FIG. 5a, made symmetrical by the use of a pair of benders 74 and 76. The benders are coupled to the lens element 78 through flexible members 80 and 82 to allow for the increase in separation between the ends of the benders and the lens mount as the lens is moved towards the position shown by dotted lines in the figure.

The invention has been described in detail with reference to presently preferred embodiments. It will be understood, however, that variations and modifications can be made within the spirit and scope of the invention. For example, the piezoelectric lens motor has been disclosed as moving a lens element to change the focus of a camera lens; the piezoelectric lens motor could similarly be used to move a lens element that changes the magnification of a camera lens in a so-called "zoom" lens system.

We claim:

1. In a photographic camera of the type having a moderately high voltage power supply for powering electronic flash apparatus, and an adjustable focus lens including a lens element movable to adjust the focus, automatic focusing apparatus comprising: means for sensing a scene to be photographed and producing a focus signal representative of the proper focus adjustment for the scene; piezoelectric motor means coupled to said movable lens element for moving said lens element in response to a moderately high voltage; and control circuit means electrically connected to said moderately high voltage power supply and responsive to said focus signal for applying a metered amount of power from said power supply to said piezoelectric motor means to move said lens element to said proper focus adjustment.

2. The invention claimed in claim 1, whererin: said motor means comprises piezoelectric bender means mounted in cantilever fashion.

3. The invention claimed in claim 2, wherein: said piezoelectric bender means comprises a plurality of piezoelectric benders symmetrically spaced around said adjustable focus lens.

4. The invention claimed in claim 3, further comprising motion amplifying mechanical linkage, wherein said bender means is coupled to said movable lens element through said motion amplifying mechanical linkage.

5. The invention claimed in claim 4, wherein: said bender elements are arranged generally parallel to the direction of motion of said movable lens element, and wherein said motion amplifying mechanical linkage comprises hinged links connected between the free ends of said benders and said lens element.

6. The invention claimed in claim 5, further comprising: an extension on one of said hinged links and a counterweight connected to the end of said extension to counterbalance the mass of said movable lens element.

7. The invention claimed in claim 1 further comprising damping means connected between said movable lens element and said camera body.

8. The invention claimed in claim 7 wherein said adjustable focus lens further includes relatively fixed elements carried in a first lens support barrel and said movable lens element is carried in a second lens support barrel concentric with said first lens support barrel, said damping means comprises pneumatic cooperation between said lens support barrels and said lens elements, whereby as the movable lens element is moved air is forced in and out of a chamber formed by said lens barrels and lens elements through a restricted passage.

9. An autofocus photographic camera, comprising:
 (a) a camera body;
 (b) a moderately high voltage power supply;
 (c) an adjustable focus lens including a lens element movable with respect to said camera body to adjust the focus;
 (d) means for sensing a scene and automatically determining the proper focus adjustment for the scene and producing a focus signal representative thereof;
 (e) piezoelectric motor means connected to said camera body and coupled to said movable lens element for moving said lens element relative to said camera body in response to a moderately high voltage, said piezoelectric motor means including a body of piezoelectric material and mechanical motion amplification means for amplifying the motion of said piezoelectric material; and
 (f) control circuit means electrically connected to said moderately high voltage power supply and responsive to said focus signal for applying a metered amount of power from said power supply to said piezoelectric motor means to move said lens element to said proper focus adjustment.

10. Lens moving apparatus for a photographic camera of the type having a moderately high voltage power supply for powering electronic flash apparatus and an adjustable lens including a movable lens element, said lens moving apparatus comprising: piezoelectric motor means coupled to said movable lens element for moving the lens element in response to moderately high voltage, and control circuit means connected to said power supply for applying power to said piezoelectric motor means to focus the lens by moving said lens element.

* * * * *